United States Patent [19]

Stencel

[11] Patent Number: 5,238,342
[45] Date of Patent: Aug. 24, 1993

[54] BLIND FASTENER WITH MECHANICAL THREAD LOCK

[75] Inventor: Edgar L. Stencel, Alta Loma, Calif.

[73] Assignee: Monogram Aerospace Industries, Inc., Los Angeles, Calif.

[21] Appl. No.: 1,046

[22] Filed: Jan. 6, 1993

[51] Int. Cl.⁵ .................... F16B 13/04; F16B 13/06
[52] U.S. Cl. ........................ 411/43; 411/55; 411/329
[58] Field of Search ............ 411/43, 55, 60, 327–329, 411/950, 951

[56] References Cited

U.S. PATENT DOCUMENTS

| 439,754 | 11/1890 | Thompson . | |
|---|---|---|---|
| 785,528 | 3/1905 | Thompson | 411/329 |
| 1,020,668 | 3/1912 | Thompson . | |
| 1,139,897 | 5/1915 | Myers | 411/327 |
| 1,153,898 | 9/1915 | Duckett | 411/329 |
| 2,521,257 | 9/1950 | Sample | 411/329 |
| 3,129,630 | 4/1964 | Wing et al. . | |
| 3,474,846 | 10/1969 | Bien . | |
| 3,643,544 | 2/1972 | Massa . | |
| 4,137,817 | 2/1979 | Siebol . | |
| 4,595,324 | 6/1986 | Sadri . | |
| 4,659,272 | 4/1987 | Pratt . | |
| 4,778,318 | 10/1988 | Jeal . | |
| 4,950,115 | 8/1990 | Sadri | 411/43 |
| 5,123,792 | 6/1992 | Strogel | 411/43 X |

Primary Examiner—Neill R. Wilson
Attorney, Agent, or Firm—Pretty, Schroeder, Brueggemann & Clark

[57] ABSTRACT

A fastener having an internally threaded nut body, an externally threaded stem and a lock collar keyed to the nut body. The lock collar has a plurality of spring arms extending radially at an angle into the internally threaded bore of the nut body. During setting of the fastener, the stem is rotated in a tightening direction relative to the nut body. However, when the fastener is fully set, the spring arms will engage axial grooves in the stem to prevent relative rotation in a loosening direction between the nut body and the stem. This configuration forms a positive mechanical lock between the stem and the nut body and prevents the fastener from loosening and losing its clamping force, even when the fastener is subjected to high levels of stress and vibration.

13 Claims, 4 Drawing Sheets

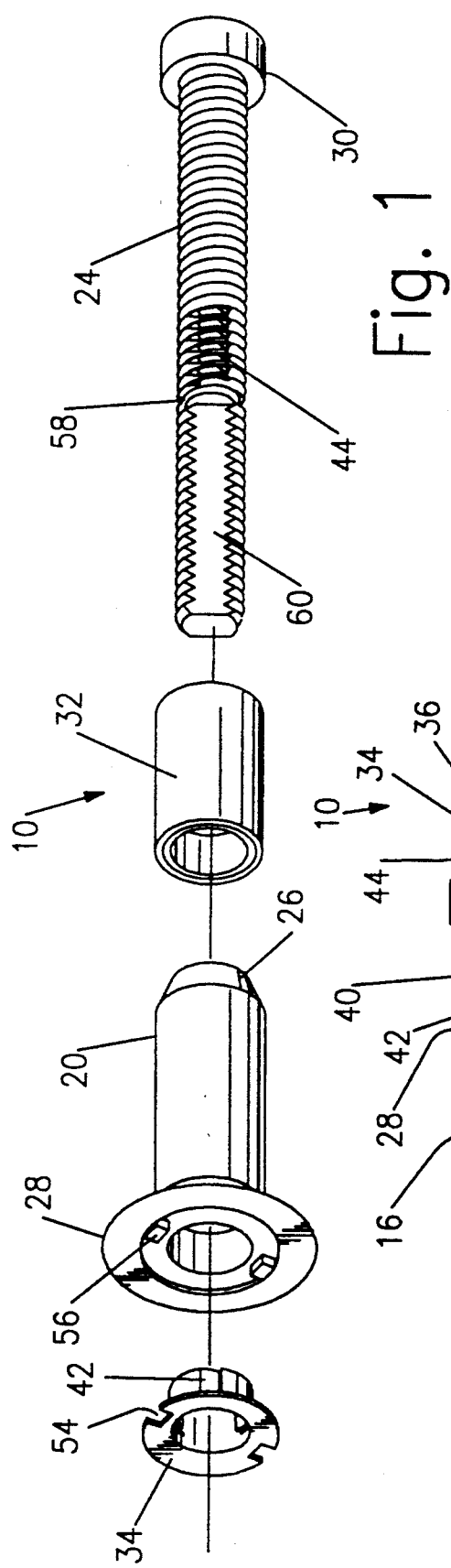
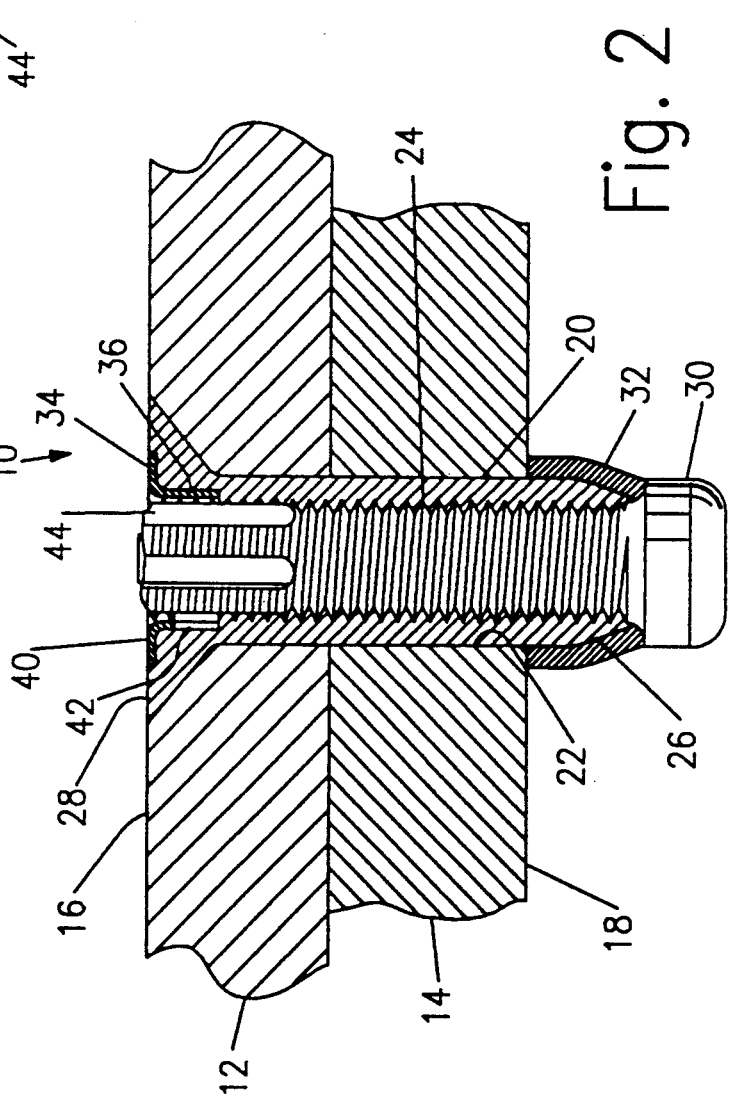

BLIND FASTENER WITH MECHANICAL THREAD LOCK

BACKGROUND OF THE INVENTION

The present invention relates to blind fasteners and, more particularly, to a threaded blind fastener having a positive mechanical locking capability to prevent unthreading.

Threaded fasteners are used in a variety of applications to connect two workpieces together and in other applications. In the construction of aerodynamic designs such as control surfaces on aircraft and the like, a substantially flush surface usually is desired on the accessible side of the panels, while access to the blind side may not be possible. In these cases, the use of a threaded blind fastener is appropriate, since access to only one side of the panel is available to install the fastener.

The use of blind fasteners in the aerospace industry imposes extremely stringent requirements which the fasteners must meet or exceed. For example, the fasteners must securely fasten the panels, yet resist losing their clamping force during the service life of the aircraft. Hence, the fastener must be able to withstand the severe stresses and vibrations imposed upon them by the often harsh environment in which they are used without loosening.

Typical blind fasteners comprise an internally threaded nut body for insertion into aligned holes in the two panels, and an externally threaded cylindrical stem passing in threaded engagement through the nut body. The inserted end of the stem has an enlarged stem head, and the outer end of the stem has a wrench engaging portion. Upon turning motion of the stem relative to the nut body, the stem is moved in an axial outward direction through the nut body. This axial outward movement causes a deformable sleeve around the stem and abutting against the stem head to deform around a tapered nose on the nut body to a fully set condition against the inner panel. The stem further may be provided with a localized weakened region or breakgroove adapted to sever the stem at a predetermined torque. The breakgroove preferably is located axially along the stem such that the stem twists off in substantially flush relation to the outer head of the nut body after the fastener is fully set. The nut body head normally is received in a countersunk, flush relationship to the outer panel, thus providing an aerodynamic surface after the fastener is set.

After the blind fastener has been installed in the panels, stress and vibration will be produced during use of the aircraft, threatening to cause the fastener to loosen and lose its gripping power. Accordingly, some type of locking mechanism must be employed to prevent the stem and nut body from rotating with respect to each other in a loosening direction. In the past, frictional locking mechanisms usually have been used to create a frictional torque lock between the interfering threads of the stem and the nut body. In other cases, positive locking mechanisms have been used, but their applicability has been limited, especially in connection with blind fasteners.

Accordingly, there has existed a definite need for a blind fastener that provides a positive mechanical lock between the stem and nut body of a blind fastener to prevent the fastener from loosening and losing its clamping force when subjected to stress, vibration and other adverse conditions, and which provides a flush surface after the fastener is set. The present invention satisfies this need and provides further related advantages.

SUMMARY OF THE INVENTION

The present invention comprises a fastener having an internally threaded nut body, an externally threaded stem and a lock collar keyed to the nut body. The lock collar has a plurality of spring arms extending radially at an angle into the internally threaded bore of the nut body. During setting of the fastener, the stem is rotated in a tightening direction relative to the nut body in the usual manner. However, when the fastener is fully set, the spring arms will engage axial grooves in the stem to prevent relative rotation in a loosening direction between the nut body and the stem. This positive mechanical lock between the stem and the nut body prevents the fastener from loosening and losing its clamping force, even when the fastener is subjected to high levels of stress and vibration, such as is experienced in aircraft applications.

In one embodiment of the invention, the fastener comprises a blind fastener in which the nut body is inserted into aligned holes in one or more panels or workpieces and has an enlarged head for engaging the outer surface of the panel. The inserted end of the stem has an enlarged stem head and a deformable sleeve extending beyond the blind side of the panel. Thus, upon turning motion of the stem relative to the nut body, the stem is moved in an axial outward direction through the nut body and deforms the sleeve into a fully set condition against the inner surface of the panel.

In this embodiment of the invention, the lock collar is seated in a counterbore of the nut body and comprises a cylindrical body defining an opening through which the stem passes, and an annular flange extending radially outwardly from one end of the cylindrical body. The circumference of the flange has a pair of notches that engage a corresponding pair of tabs within the counterbore of the nut body. These tabs prevent the lock collar from rotating with respect to the nut body. During assembly of the fastener at the factory, these tabs are deformed to overlie the portion of the annular flange surrounding the notches. This fully keys the lock collar to the nut body and also prevents axial movement between the lock collar and the nut body.

The spring arms extend from the cylindrical body of the lock collar into the internally threaded bore of the nut body. The spring arms are angled such that the stem may be rotated in a tightening direction relative to the nut body to set the fastener in the usual manner. That is, when the fastener is being set, the spring arms ride on the stem threads and pass over the grooves during turning of the stem in the tightening direction. However, when the fastener is fully set, any rotation of the stem in a loosening direction will cause at least one of the spring arms to snap into engagement with one of the axial grooves in the stem. This engagement is a positive mechanical engagement that effectively locks the stem to the nut body to prevent loosening of the fastener.

In one aspect of the invention, there are six axial grooves spaced equally around the circumference of the stem. These grooves are located axially along the stem such that, when the fastener is fully set, the grooves will be axially aligned with the spring arms of the lock collar. In this embodiment, there also are three spring arms spaced equally around the lock collar.

In another embodiment of the invention, there are six equally spaced axial grooves, but the spacing between the three spring arms is different. Here, the spring arms are spaced apart from each other by 100°, 100° and 160°, respectively, around the lock collar. This special arrangement and configuration of the three spring arms is important and minimizes loosening of the fastener. By using this configuration, the stem can only rotate a maximum of twenty degrees in a loosening direction before one of the spring arms engages one of the axial grooves. This amount of stem rotation is very small and does not adversely affect the clamping force of the fastener.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective assembly view of a blind fastener embodying the novel features of the present invention;

FIG. 2 is a cross-sectional view of the fastener shown in a fully set condition;

DETAILED DESCRIPTION OF THE PREFERRED EMBODIMENTS

Figure 7:
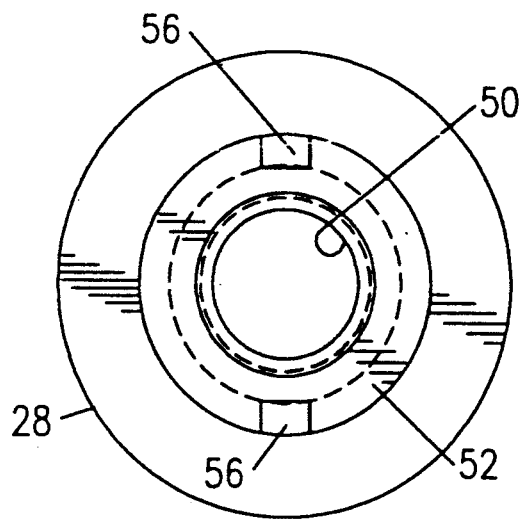
FIG. 7 is a plan view of the nut body.

As shown in FIGS. 1-2 of the drawings, the present invention is embodied in a blind fastener, generally referred to by the reference numeral 10, for use in connecting two panels 12 and 14 together in overlapped outer and inner relation. In general, the outer panel 12 has an accessible outer surface 16, and the inner panel has an inaccessible or blind surface 18. The fastener 10 comprises an internally threaded, generally tubular nut body 20 received within aligned openings 22 in the two panels 12 and 14, and an externally threaded cylindrical stem 24 passing in threaded engagement through the nut body. The nut body 20 has a tapered nose 26 projecting inwardly beyond the inner surface 18 of the inner panel 14, and an enlarged body head 28 received in a substantially flush, countersunk relationship to the outer surface 16 of the outer panel 12. Of course, enlarged body heads of the non-flush, protruding head type also may be used.

The stem 24 has an enlarged head 30 at its inserted or inner end for abutment with a substantially cylindrical, deformable sleeve 32. The outer dimensions of the nut body 20, stem head 30 and sleeve 32 are substantially the same, but are slightly less than, the diameters of the openings 22 in the two panels 12 and 14. This sizing of the fastener 10 permits insertion of the fastener through the openings 22 in the two panels 12 and 14 to enable the fastener to perform its clamping function on the blind side 18, as explained in more detail below. Alternatively, the fastener 10 may be sized to provide an interference fit between the fastener and the aligned openings 22 in the panels 12 and 14.

Figure 3:
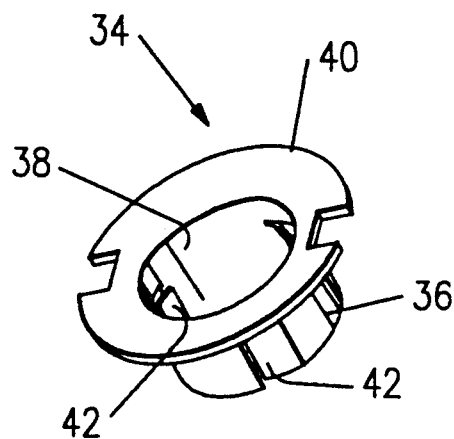
FIG. 3 is a perspective view illustrating one embodiment of a lock collar made in accordance with the teachings of this invention.
Figure 4:
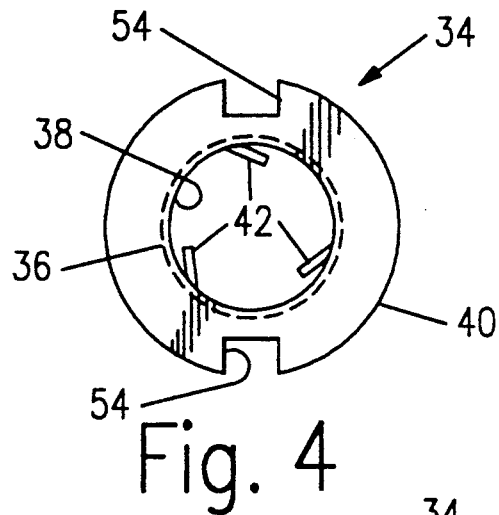
FIG. 4 is a plan view of the lock collar.
Figure 5:
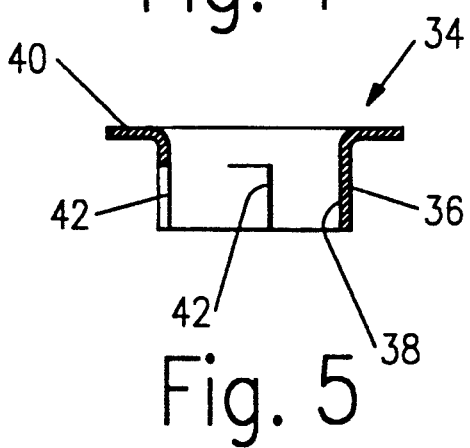
FIG. 5 is a cross-sectional view of the lock collar.

In accordance with the present invention, a lock collar 34 positioned between the nut body 20 and the stem 24 creates a positive mechanical lock that prevents the fastener 10 from loosening and losing its clamping force during its use on an aircraft or other structure in which it is installed. In one embodiment of the lock collar 34, illustrated in FIGS. 3-5, the lock collar comprises a cylindrical body 36 defining an opening 38 through which the stem 24 passes, and an annular flange 40 extending radially outward at one end of the cylindrical body 36. A plurality of spring arms 42 are formed in the cylindrical body 36 of the lock collar 34 and extend radially inward at an angle. The spring arms 42 may be formed by conventional stamping techniques in which a portion of the cylindrical body 36 is stamped radially inwardly at an angle in the manner shown.

The spring arms 42 of the lock collar 34 are angled inwardly at the same angle and are adapted to fit within special axial grooves 44 in the stem 24, as described in more detail below. Each of these axial grooves 44 is configured so that the spring arms 42 will pass over the grooves when the stem 24 is rotated in a tightening direction to set the fastener, but will engage the axial grooves when the stem is rotated in an opposite or loosening direction. This is accomplished by forming the axial grooves 44 with an abrupt wall 46 in a plane substantially parallel to the diameter of the stem 24 and a more gradual wall 48 of greater length. Both the abrupt wall 46 and the gradual wall 48 intersect at substantially a right angle. (See FIG. 8).

The lock collar 34 can be formed by conventional stamping techniques and preferably is constructed from steel materials, such as A-286 cres, and heat treated. The nut body 20 and stem 24 also are preferably constructed from steel materials, such as A-286 cres, and heat treated. The deformable sleeve is constructed from relatively softer steel materials to enable it to perform its function of deforming over the tapered nose 26 of the nut body 20 and clamping against the blind surface 18 of the inner panel 14.

Figure 6:
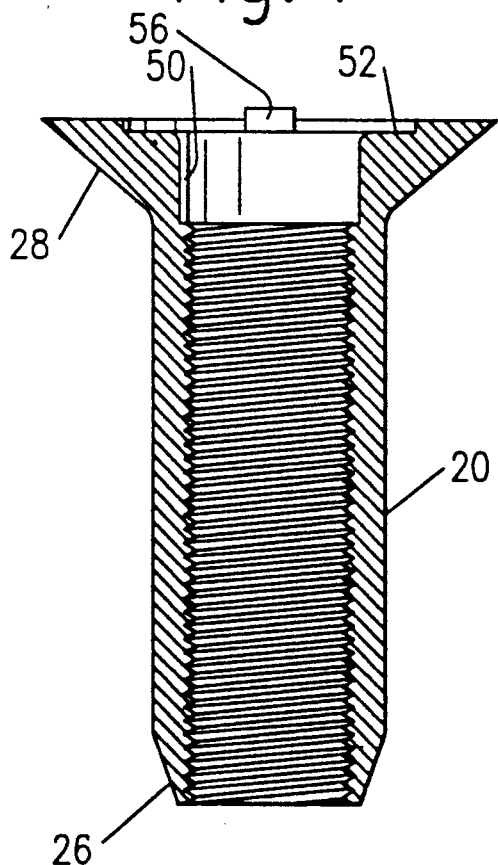
FIG. 6 is a cross-sectional view of one embodiment of a nut body made in accordance with the teachings of the present invention.
Figure 8:
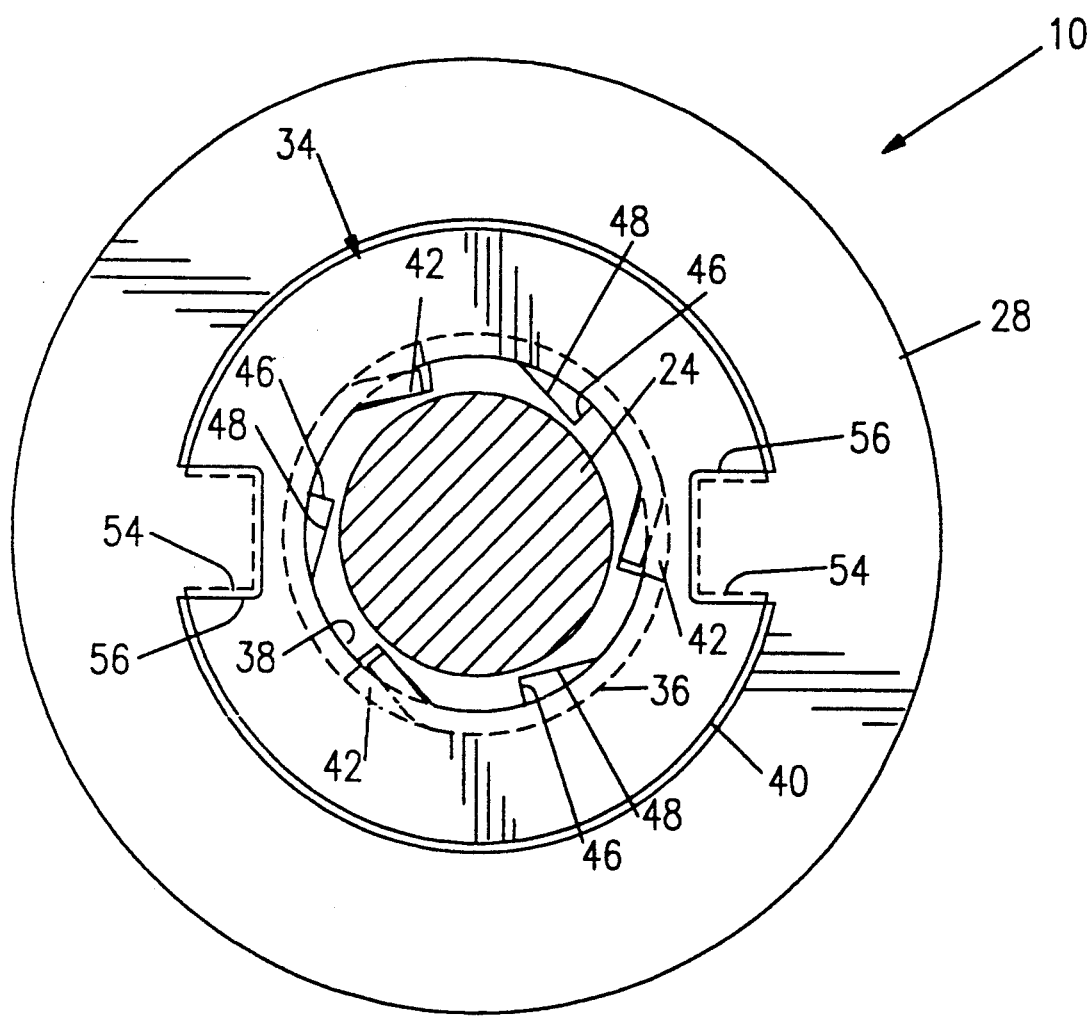
FIG. 8 is a plan view of the fastener shown in a fully set condition.

With reference to FIGS. 6-7, and also FIGS. 2 and 8, the outer end of the nut body 20 in the area of the enlarged head 28 has two counterbores 50 and 52 for receiving the lock collar 34. The cylindrical body 36 is received within the first counterbore 50 adjacent to the internal threads of the nut body 20, while the annular flange 40 is received within the second counterbore 52 in the nut body head 28. In the preferred embodiment, the annular flange 40 and the nut body head 28 form a substantially flush surface when the lock collar 34 is installed within the nut body 20.

The lock collar 34 is keyed to the nut body 20 to prevent both rotational and axial movement of the lock collar with respect to the nut body. As shown in FIGS. 3-4 and 7-8, the circumference of the annular flange 40 has a pair of notches 54 that are designed to receive a pair of corresponding tabs 56 in the second counterbore of the nut body. These tabs prevent the lock collar 34 from rotating with respect to the nut body 20. During assembly of the fastener 10, for example, at the factory, these tabs 56 are deformed to overlie the portion of the annular flange 40 surrounding the notches 54. (See FIG. 8). This prevents axial movement between the lock collar 34 and the nut body 20 and, thus, fully keys the lock collar to the nut body to prevent both rotational and axial movement between these two elements.

When the lock collar 34 is fully installed in the nut body 20, the stem 24, with its deformable sleeve 32 in position, is threaded through the nut body until the deformable sleeve is adjacent to the tapered nose 26 of the nut body. At this point, the fastener 10 is ready to be installed in a workpiece, to connect two panels 12 and 14 together, as illustrated in FIG. 2, or in another appropriate application.

To set the fastener 10 and clamp the two panels 12 and 14 together, the stem 24 is turned in one direction, i.e., the tightening direction, relative to the nut body 20. This turning motion causes the stem 24 to move in an axial outward direction through the nut body 20, forcing the sleeve 32 over the tapered nose 26 and against the inner surface 18 of the inner panel 14, forming a secure connection between the two panels 12 and 14. If desired, a localized weakened region or breakgroove 58 may be provided at an axial location along the stem 24 such that the stem twists off at a point substantially flush with the nut body head 28, after the fastener 10 is fully set.

Turning of the stem 24 relative to the nut body 20 to set the fastener 10 is accomplished preferably by applying a torque to the stem while holding the nut body against rotational movement. To enable turning of the stem 24, the outer end of the stem 24 is provided with a pair of wrenching flats 60 adapted to engage the rotary wrench bit of an installation tool (not shown). To prevent turning of the nut body 20 within the panels 12 and 14 while the stem 24 is being turned, a drive nut (not shown) may be mounted on the stem in abutment with the nut body head 28. The drive nut typically has an outer surface for engagement by a non-rotating fitting on the installation tool and an inner surface that is threaded for engagement with the externally threaded stem 24.

As the fastener 10 is being set, the spring arms 42 will ride on the external stem threads and, when the stem 24 has advanced sufficiently, will pass over the axial grooves during turning of the stem in the tightening direction. The spring arms 42 are allowed to pass over the axial grooves 44 without engaging them because the arms are angled radially inwardly in the manner shown. When the fastener 10 is fully set, the outer portion of the stem 24 will sever at the breakgroove 58 leaving a substantially flush outer surface. At this point, one of the spring arms 42 may or may not be in engagement with one of the axial grooves 44 in the stem 24. If one of the spring arms 42 is engaged with one of the axial grooves 44, then the stem 24 will not be allowed to rotate in the loosening direction at all because the spring arm 42 provides a positive mechanical engagement preventing such rotation. However, if one of the spring arms 42 is not engaged with one of the axial grooves 44, then the stem 24 will be permitted to rotate a limited amount in the loosening direction until one of the spring arms engages one of the axial grooves.

In one embodiment of the invention, there are six axial grooves 44 spaced equally around the circumference of the stem 24. These grooves 44 are located axially along the stem 24 such that, when the fastener 10 is fully set, the grooves will be axially aligned with the spring arms 42 of the lock collar 34. In this embodiment, there also are three spring arms 42 spaced equally around the lock collar 34. This configuration using six axial grooves 44 and three spring arms 42 provides important advantages and minimizes the amount of rotation of the stem 24 in a loosening direction before one of the spring arms 42 engages one of the axial grooves 44.

Figure 9A:
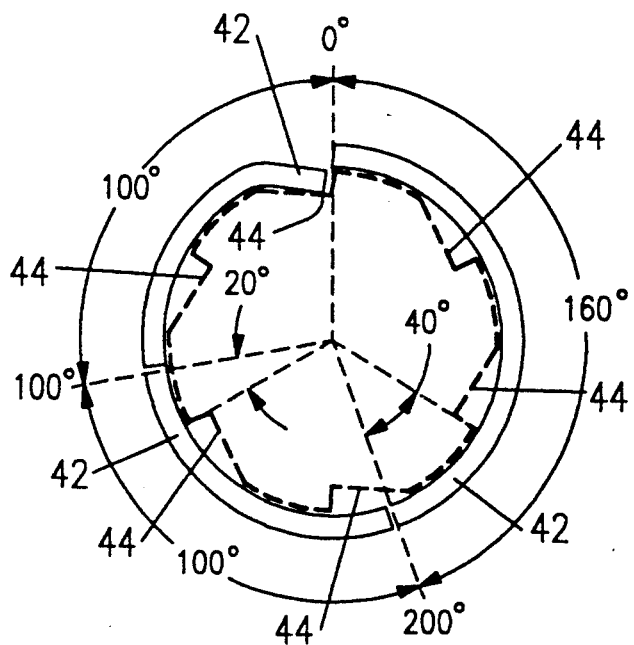
FIGS. 9A-9C are schematic plan views of a second embodiment of the lock collar and the various positions it may assume when locking the fastener in accordance with the present invention.
Figure 9B:
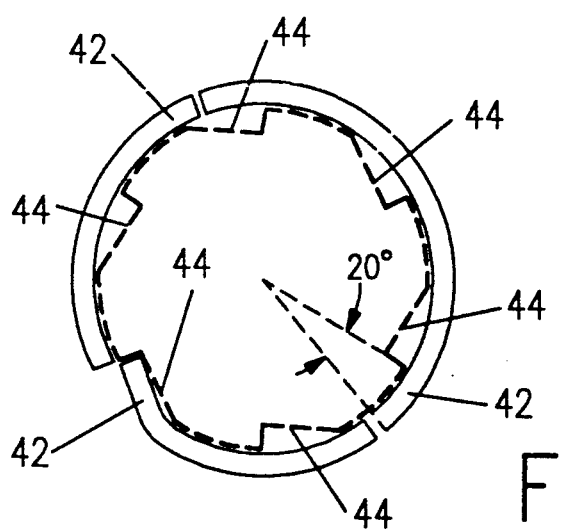
Figure 9C:
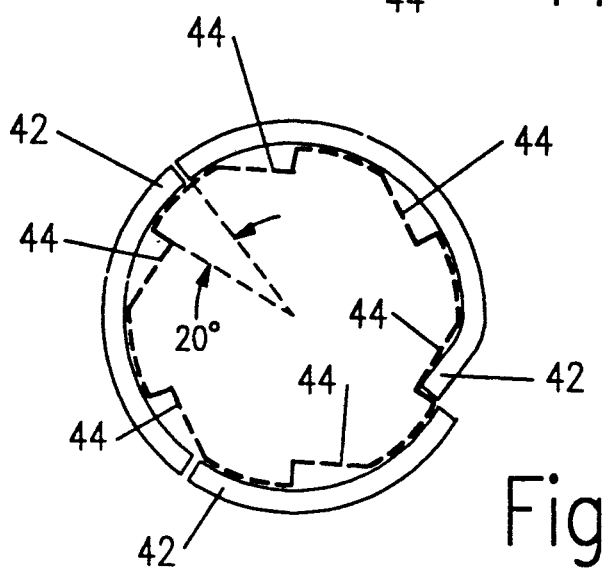

In an alternative and preferred embodiment shown in FIGS. 9A-9C, there are six axial grooves 44 spaced equally around the circumference of the stem 24 and three spring arms 42 which are not spaced equally around the lock collar 34. Here, the three spring arms 42 are separated by 100°, 100° and 160°, respectively. By using this special arrangement and configuration, the stem 24 can rotate a maximum of only 20° in a loosening direction before one of the spring arms 42 engages one of the axial grooves 44. For example, FIG. 9A shows one of the spring arms 42 in engagement with one of the axial grooves 44. FIG. 9B shows the amount of rotation of the stem in a loosening direction that can occur before the next spring arm 42 engages the next axial groove 44. This amount of rotation in a loosening direction is a maximum of 20°. FIG. 9C is similar and shows that a maximum of only 20° of rotation of the stem 24 in a loosening direction can occur from the position as shown in FIG. 9B.

In actual practice, when the fastener 10 is fully set, one of the spring arms 42 either will be in engagement with one of the axial grooves 44 or all three of the spring arms will be in contact with the crests of the stem threads between pairs of the six axial grooves. Should the stem 24 begin to rotate in a loosening direction, the spring arms 42 will ride on the crests of the stem threads until one of the spring arms snaps into engagement with one of the axial grooves 44. This engagement will occur upon less than 20° of stem rotation. Hence, it is unlikely that the stem 24 actually would rotate a full 20°, since in most cases one spring arm 42 either will be already in engagement with one of the axial grooves 44 or at a location between the axial grooves, leaving less than a full 20° of rotation prior to engagement.

Fasteners made in accordance with the present invention allow the fastener 10 to maintain maximum clamping loads. After a fastener is set, each degree of stem rotation in the loosening direction translates into a loss of preload clamping force and, thus, lessens the effective clamping ability of the fastener. However, a stem rotation of 20° in the loosening direction is considered very small and is generally acceptable because it will not result in an unacceptable loss of preload. For example, in a fully set fastener having a preload of approximately 1,700 pounds, a maximum of 20° of stem rotation in the loosening direction will result in a loss of preload of about 250 pounds, leaving final preload of approximately 1,450 pounds. This is an acceptable loss of preload according to current industry standards.

One of the main advantages of the fastener 10 of the present invention is that it provides a positive mechanical lock between the stem 24 and the nut body 20 to positively prevent loosening of the fastener and reduction of its preload beyond a certain predetermined amount. This is in contrast with the frictional locks in which a frictional engagement or interference is created between the external threads of the stem and the internal threads of the nut body. With these types of frictional locking mechanisms, there is no assurance that the stem will not continue to rotate in a loosening direction beyond a predetermined amount over time. Prior attempts at producing a mechanical lock between the stem and the nut body have met with limited applicability to blind fasteners, which often require a flush surface, such as on aircraft control surfaces and the like.

Accordingly, the present invention provides superior advantages in that the lock collar 34 is located and keyed completely within the nut body 20 and enables a flush surface when the fastener 10 is fully set. Since the lock collar 34 is keyed to the nut body 20 at the factory, no separate installation steps are necessary by the user to achieve the locking function. Moreover, the special arrangement and configuration of spring arms 42 and axial grooves 44 provides a positive locking relationship with a minimum potential for stem rotation in the loosening direction. This provides maximum clamping preload forces and the most reliable fastener possible.

While the particular form of the invention has been illustrated and described, it will be apparent that various modifications can be made without departing from the spirit and scope of the invention. Accordingly, it is not intended that the invention be limited, except as by the appended claims.

I claim:

1. A fastener, comprising:
   (a) a nut body having an internally threaded bore and a surface for engaging one side of a workpiece;
   (b) an externally threaded stem received in threaded engagement with the internally threaded bore of the nut body, wherein the stem has an enlarged head for engaging the other side of the workpiece, and wherein a portion of the stem has a plurality of axial grooves spaced around the circumference of the stem; and
   (c) a lock collar received within the bore of the nut body and keyed thereto to prevent relative rotation or axial movement between the lock collar and nut body, wherein the lock collar has a plurality of spring arms extending radially at an angle into the bore of the nut body for engagement with the axial grooves in the stem to prevent relative rotation in a loosening direction between the nut body and the stem when the fastener is fully set.

2. The fastener of claim 1, wherein there are six axial grooves spaced equally around the stem and there are three spring arms spaced equally around the lock collar.

3. The fastener of claim 1, wherein the axial grooves and spring arms are arranged such that at least one of the spring arms will engage one of the axial grooves for every twenty degrees of relative rotation in the loosening direction between the nut body and the stem.

4. The fastener of claim 3, wherein there are six axial grooves spaced apart by 60° around the stem, and wherein there are three spring arms spaced apart by 100°, 100° and 160°, respectively, around the lock collar.

5. The fastener of claim 1, wherein the lock collar comprises:
   (a) a cylindrical body defining an opening through which the stem passes; and
   (b) an annular flange formed at one end of the cylindrical body received within a counterbore in the nut body, wherein the spring arms extend radially inward from the cylindrical body for engagement with the axial grooves in the stem.

6. The fastener of claim 5, wherein the lock collar is keyed to the nut body by a pair of tabs in the counterbore received within a corresponding pair of notches in the annular flange, such that when the tabs are deformed to overlie a portion of the annular flange contiguous with the notches, relative rotation and axial movement of the lock collar with respect to the nut body is prevented.

7. A blind fastener for mounting in aligned openings through two panels to connect them together in overlapped outer and inner relation, the fastener comprising:
   (a) an internally threaded, generally tubular nut body received within the openings in the panels, the nut body having an inner end projecting inwardly beyond the inner panel, and an enlarged body head for engagement with the outer surface of the outer panel;
   (b) an externally threaded cylindrical stem passing in threaded engagement through the nut body, such that turning motion of the stem relative to the nut body in a tightening direction moves the stem in an axial outward direction through the nut body, the stem having an enlarged stem head spaced from the inner end of the nut body, and a wrench engaging region spaced from the outer end of the nut body;
   (c) a deformable sleeve around the stem adjacent to the stem head, wherein movement of the stem outwardly through the nut body deforms the sleeve to a fully set condition in overlying contact with the inner surface of the inner panel; and
   (d) a lock collar received within a counterbore of the nut body and keyed thereto to prevent relative rotation and axial movement between the lock collar and the nut body, wherein the lock collar has a plurality of spring arms extending radially inward at an angle for engagement with axial grooves in the stem upon relative rotation in a loosening direction between the nut body and the stem.

8. The blind fastener of claim 7, wherein at least one of the spring arms is adapted to engage at least one of the axial grooves for every 20° of relative rotation in a loosening direction between the nut body and the stem.

9. The blind fastener of claim 8, wherein there are six axial grooves spaced apart by 60° around the stem, and wherein there are three spring arms spaced apart by 100°, 100° and 160°, respectively, around the lock collar.

10. The blind fastener of claim 8, wherein there are six axial grooves spaced equally around the stem and there are three spring arms spaced equally around the lock collar.

11. The blind fastener of claim 8, wherein the lock collar comprises:
   (a) a cylindrical body received within a first counterbore in the nut body head and defining an opening through which the stem passes; and
   (b) an annular flange formed at an outer end of the cylindrical body received within a second counterbore in the nut body head, such that the annular flange and nut body head form a substantially flush surface, and wherein the spring arms extend radially inward from the cylindrical body for engagement with the axial grooves in the stem.

12. The blind fastener of claim 11, wherein the lock collar is keyed to the nut body by a pair of tabs in the second counterbore that are received within a corresponding pair of notches in the annular flange, such that when the tabs are deformed to overlie a portion of the annular flange contiguous with the notches, relative rotation and axial movement of the lock collar with respect to the nut body is prevented.

13. A blind fastener for mounting in aligned openings through two panels to connect them together in overlapped outer and inner relation, the fastener comprising:

(a) an internally threaded, generally tubular nut body received within the openings in the panels, the nut body having an inner end projecting inwardly beyond the inner panel, and an enlarged body head for engagement with the outer surface of the outer panel;

(b) an externally threaded cylindrical stem passing in threaded engagement through the nut body, such that turning motion of the stem relative to the nut body in a tightening direction moves the stem in an axial outward direction through the nut body, the stem having an enlarged stem head spaced from the inner end of the nut body, a wrench engaging region spaced from the outer end of the nut body, and six axial grooves equally spaced apart by 60° around the stem;

(c) a deformable sleeve around the stem adjacent to the stem head, wherein movement of the stem outwardly through the nut body deforms the sleeve to a fully set condition in overlying contact with the inner surface of the inner panel; and (d) a lock collar received within a counterbore of the nut body and keyed thereto to prevent relative rotation and axial movement between the lock collar and the nut body, wherein the lock collar has three spring arms extending radially inward at an angle for engagement with the axial grooves in the stem upon relative rotation in a loosening direction between the nut body and the stem, wherein the three spring arms are spaced apart from each other by 100°, 100° and 160°, respectively, around the lock collar.

* * * * *